United States Patent [19]

Brown

[11] 4,320,027

[45] Mar. 16, 1982

[54] PROCESS FOR PRODUCING HIGHLY STABILIZED BORANE-TETRAHYDROFURAN SOLUTIONS

[75] Inventor: Herbert C. Brown, West Lafayette, Ind.

[73] Assignee: Aldrich-Boranes, Inc., Milwaukee, Wis.

[21] Appl. No.: 146,156

[22] Filed: May 2, 1980

[51] Int. Cl.$^3$ .............................................. C09K 3/00
[52] U.S. Cl. ................................... 252/188; 252/105; 149/22; 260/462 R; 423/294; 423/295; 568/6
[58] Field of Search ................. 252/188, 105; 149/22; 260/462 R, 606.5 B; 423/294, 295

[56] References Cited

U.S. PATENT DOCUMENTS 3,634,277  1/1972  Brown .................. 252/188
3,882,037  5/1975  Brown .................. 252/188

Primary Examiner—Benjamin R. Padgett
Assistant Examiner—J. L. Barr
Attorney, Agent, or Firm—Merriam, Marshall & Bicknell

[57] ABSTRACT

A process which comprises heating a stabilized solution of borane in tetrahydrofuran containing an organic sulfide and finely divided particles of sodium fluoroborate at an elevated temperature for a period of time sufficient to convert the sodium fluoroborate particles to a form which permits them to be readily removed from the solution such as by settling, filtration or centrifugation.

5 Claims, No Drawings

PROCESS FOR PRODUCING HIGHLY STABILIZED BORANE-TETRAHYDROFURAN SOLUTIONS

This invention relates to solutions of diborane in tetrahydrofuran. More particularly, this invention is concerned with stabilized diborane solutions in tetrahydrofuran produced without the use of diborane gas in the process and essentially free of insoluble reaction by-products.

BACKGROUND OF THE INVENTION

Diborane is highly soluble in tetrahydrofuran and forms a borane addition compound with it. [J. R. Elliott, W. L. Roth, G. F. Roedel, and E. M. Boldebuck, *J. Am. Chem. Soc.*, 74, 5211 (1952)]. Such solutions are highly valuable for the hydroboration of olefins and the reduction of organic compounds as is illustrated by the following chemical equations:

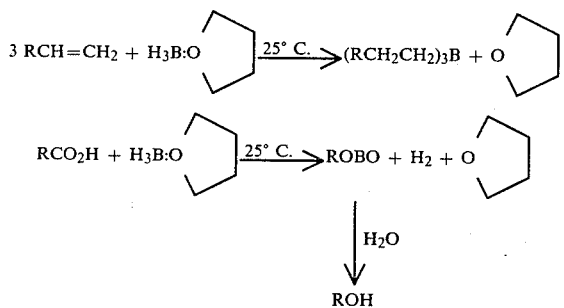

The diborane solutions, unfortunately, are unstable and lose hydride with reductive opening of the tetrahydrofuran ring [J. Kollonitsch, *J. Am. Chem. Soc.*, 83, 1515 (1961)].

A solution of diborane in tetrahydrofuran can be prepared without handling diborane gas by treating a suspension of sodium borohydride in tetrahydrofuran with the stoichiometric amount of boron trifluoride, as is shown by the following chemical equation:

This process is disclosed in my U.S. Pat. No. 3,634,277, with the use of an excess borohydride to stabilize the solution. The resulting diborane solution contained some of the sodium fluoroborate originally present as a finely divided material which was difficult to remove by settling, filtration or centrifugation.

One method which is sometimes used to convert a finely divided material into a more easily handled solid is the application of heat. Elevating the temperature of the suspension, at times, will result in crystal growth or agglomeration of the particles. The resulting larger sized particles are then removed more easily by settling, filtration or centrifugation.

The application of heat to the diborane solution in tetrahydrofuran, such as that produced according to my U.S. Pat. No. 3,634,277, to make the finely divided sodium fluoborate therein more easy to handle was not feasible. This was because raising the solution temperature to reflux resulted in escape of diborane as a volatile gas and greatly magnified reductive cleavage of the solvent.

In my U.S. Pat. No. 3,882,037 I described the synthesis of stabilized borane-tetrahydrofuran solutions. Such solutions, containing an equimolar amount of an organic sulfide, i.e., an aliphatic, alicyclic, or cyclic sulfide, are readily stored for long periods of time at ambient temperatures. These solutions can be prepared also without handling diborane gas by treating suspensions of sodium borohydride in tetrahydrofuran, containing the aliphatic, alicyclic, or cyclic sulfide, with the stoichiometric amount of boron trifluoride. Unfortunately, even in this process the sodium fluorborate separates as a finely divided precipitate which again has proven difficult to remove by settling, filtration or centrifugation.

The stabilized borane-tetrahydrofuran solutions containing an organic sulfide summarized above and disclosed in my U.S. Pat. No. 3,882,037 were studied for extended storage stability at 25° C. (ambient temperature), as see Table I of that patent, but not at a higher temperature.

SUMMARY OF THE INVENTION

It has now been discovered, according to the invention, that borane-tetrahydrofuran solutions containing an organic sulfide are far more stable at elevated temperatures than was previously believed. This discovery has made it possible to provide a novel and practical process of separating suspended sodium fluoroborate from such solutions.

According to the invention, a solution of diborane in tetrahydrofuran stabilized by having an organic sulfide dissolved therein, and containing finely divided sodium fluoroborate, is heated to an elevated temperature which is sufficiently high, and for a long enough time, to cause the sodium fluoroborate to form into particles which are readily removed from the solution by settling, filtration or centrifugation.

Any suitable elevated temperature can be used to convert the sodium fluoroborate particles into a form which permits their ready removal from the solution. Generally, a temperature of at least 35° C. will be used, with the maximum temperature being the reflux or boiling temperature at atmospheric pressure. (The boiling point of tetrahydrofuran is 65°-6° C. but the boiling point of the solution is slightly lower.) Modestly higher temperatures can be utilized by applying increased pressure.

Heating at the elevated temperature should continue until conversion of the sodium fluoroborate particles to a suitable form is essentially completed. This will take somewhat longer at lower, than at higher, elevated temperatures.

Heating the solution at reflux under atmospheric pressure for about 30 minutes generally completes conversion of the sodium fluoroborate particles to a form which permits their ready removal from the solution by settling, filtration or centrifugation. However, it has been determined that the solutions can be heated at reflux for 24 hours or more without detectable reductive cleavage of the tetrahydrofuran solvent with, of course, the desired conversion of the particles to a form which facilitates their removal. This illustrates the unexpected elevated temperature stability of the diborane solutions in tetrahydrofuran stabilized with an organic sulfide.

The development of this invention makes it practical to manufacture the highly stabilized borane solutions in tetrahydrofuran described in my U.S. Pat. No. 3,882,037 without using diborane gas.

Any suitable organic sulfide can be used. Sulfides which can be used include aliphatic sulfides, such as dimethyl sulfide, methylethyl sulfide, diethyl sulfide, methylpropyl sulfide, methylbutyl sulfide, and other lower alkyl sulfides; alicyclic sulfides, such as methylcyclopentyl sulfide and methylcyclohexyl sulfide; cyclic sulfides, such as tetramethylene sulfide, pentamethylene sulfide and heptamethylene sulfide; and disulfides, such as 1,3-dithiomethylpropane, $CH_3SCH_2CH_2CH_2SCH_3$. The organic sulfides can contain inert substituents, such as oxygen ether and methyl groups, as in $CH_3OCH_2CH_2SCH_3$, 1,4-thioxane and 2-methyltetramethylene sulfide. For greatest effectiveness, it is desirable that the molecular weight of the sulfide be low, preferably below 200, so that relatively high molar concentrations can be achieved in the tetrahydrofuran solutions without markedly decreasing the tetrahydrofuran content of these solutions. Dimethyl sulfide is preferred because of its low molecular weight and its low cost.

It is preferred that the concentration of the sulfide used to stabilize diborane-tetrahydrofuran solutions be equal, on a molar basis, to the concentration of borane ($BH_3$ in the solution). Thus, for example, a solution that is 2 molar in borane is advisedly also 2 molar in the sulfide. As the concentration of sulfide added to the solution drops below that of the borane, the solution becomes increasingly less inhibited against borane loss. For purposes of the invention, any concentration of sulfide above about 50 percent of the molar concentration of borane will yield a practical benefit in stability, with the maximum effect being achieved at an equimolar concentration. Solutions more concentrated in sulfide than equimolar with borane can also be used, but are less desirable, since no significant increase in stability is achieved, while the tetrahydrofuran concentration of the solution may be undesirably reduced.

EXAMPLE

A 100 ml round-bottom flask, with sidearm containing a magnetic stirring bar, was connected to a reflux condenser under nitrogen atmosphere. Into the predried flask was placed 2.33 g (61 mmol) of sodium borohydride (0.94 M), 6 ml (80 mmol) of dimethyl sulfide (1.25 M), and 48 ml of tetrahydrofuran. The apparatus was flushed with nitrogen and 10 ml (80 mmol) of boron trifluoride ethyl ether was slowly introduced to the mixture. The reaction mixture was heated under reflux temperature for 30 min., proceeding to 100% (1.25 M of BMS) completion. A white solid, sodium tetrafluoroborate, was formed and precipitated out quickly at 25° C. for 30 min. Then 50 ml of the clear solution of borane-methyl sulfide (BMS) in tetrahydrofuran was transferred by double-ended needle to a graduate cylinder. The concentration of borane-methyl sulfide was redetermined by hydrolysis of the clear solution, giving 1.33 M solution. Accordingly, the total recovery of mmol of borane-methyl sulfide corresponded to 69 mmol [=50 (ml)×1.33 (M)+2 (ml)×1.25 (M)] out of 80 mmol.

The clear borane-methyl sulfide solution in tetrahydrofuran prepared from the reaction was also studied for purity. To a predried and weighed 50 ml flask containing a magnetic stirring bar and an inlet for nitrogen was introduced 7.5 ml (10 mmol, 1.33 M) of borane-methyl sulfide (BMS) in tetrahydrofuran. The flask was evacuated at 25° C. and 0.9 mm for 20 min. to pump off all of the BMS and THF and leave a trace residue of sodium tetrafluoroborate. Additionally, evacuation of pure borane-methyl sulfide in tetrahydrofuran prepared by Aldrich-Boranes, Inc. revealed a similar result under identical conditions. Accordingly, a 86% recovery of 99% pure borane-methyl sulfide can be obtained from the reaction. This was also confirmed by $^{11}B$ NMR spectra. The spectrum indicated a quartet centered at −20.09 ppm in THF [lit. −20.30 ppm in neat].

The foregoing detailed description has been given for clearness of understanding only, and no unnecessary limitations should be understood therefrom, as modifications will be obvious to those skilled in the art.

What is claimed is:

1. The process which comprises heating a stabilized solution of borane in tetrahydrofuran containing an aliphatic, alicyclic or cyclic sulfide in a molar amount above about 50% of the molar amount of borane in the solution and finely divided particles of sodium fluoroborate at a temperature from 35° C. to the reflux temperature of the solution for a period of time sufficient to convert the sodium fluoroborate particles to a form which permits them to be readily removed from the solution such as by settling, filtration or centrifugation.

2. The process of claim 1 in which the organic sulfide contains an oxygen ether linkage.

3. The process of claim 1 in which the organic sulfide is dimethyl sulfide.

4. The process of claim 2 in which the organic sulfide is 1,4-thioxane.

5. The process of claim 3 in which the elevated temperature is the reflux temperature of the solution.

* * * * *